United States Patent Office 2,957,741
Patented Oct. 25, 1960

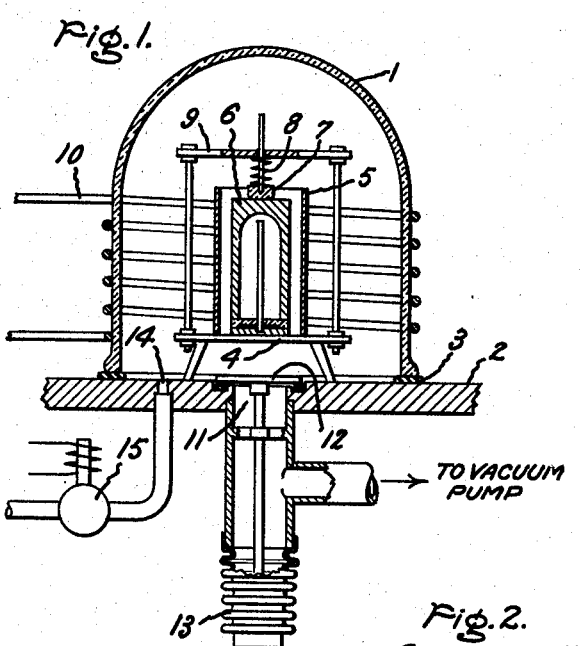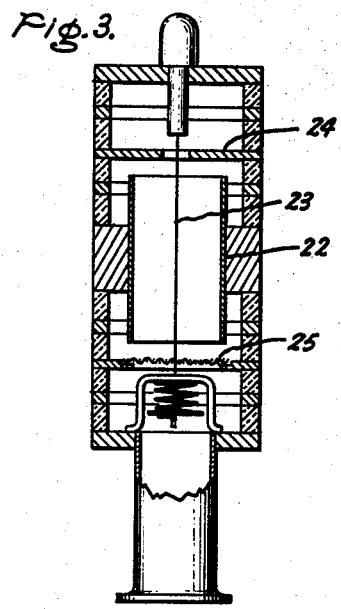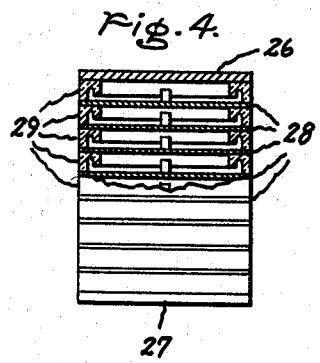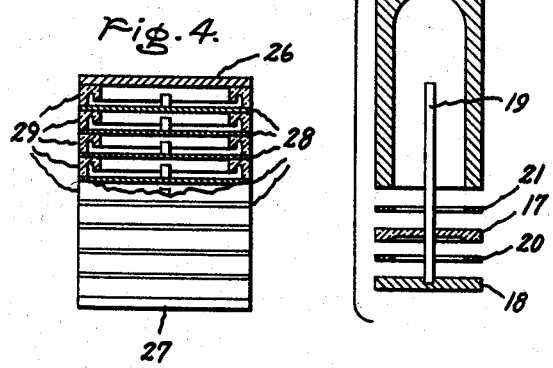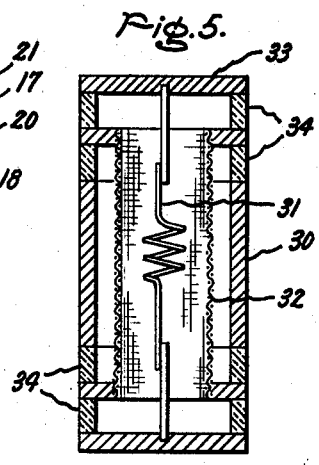

2,957,741

FORMATION OF ELECTRIC DISCHARGE DEVICES

James M. Lafferty, Schenectady, N.Y., assignor to General Electric Company, a corporation of New York Filed Oct. 17, 1957, Ser. No. 690,849

12 Claims. (Cl. 316—19)

The present invention relates to improved methods for the fabrication of electric discharge devices and, more particularly, is related to construction of ceramic gaseous electric discharge devices.

It is an object of the present invention to provide an improved method for fabricating metal and ceramic electric discharge devices which result in devices having improved leakage resistance characteristics.

A further object of the invention is to provide a method for fabricating electric discharge devices which obviates the necessity of using complicated vacuum systems.

Another object of the invention is to provide a one-step method for forming gaseous electric discharge devices.

Still another object of the invention is to provide a method of constructing gaseous electric discharge devices having a heretofore unobtainably pure inert gas therein.

In accord with the present invention I construct gaseous electric discharge devices of ceramic and metal by stacking the metal and ceramic parts together, interposing between each metal and ceramic part a thin wafer of a sealing material which may be any metal or alloy which forms, with the metallic part, a low melting eutectic which wets the ceramic. The stacked array is then held together with moderate pressure and fired in an atmosphere of the noble gas or gases with which the device is to be charged at a pressure which is a multiple of the device operating gas pressure equal to the ratio of the absolute temperature at which the device is formed to the absolute temperature at which the device is to operate.

The novel features characteristic of the invention are set forth with particularity in the appended claims. The invention itself, together with further objects and advantages thereof may best be understood by reference to the following detailed description, taken in connection with the attached drawing in which:

Fig. 1 illustrates a suitable apparatus with which the invention may be practiced and includes a vertical cross-sectional view of one device which may be constructed in accord with the invention;

Fig. 2 is an exploded cross-sectional view of the device illustrated in Fig. 1; and Figs. 3, 4 and 5 illustrate other devices which may be constructed in accord with the invention.

Present-day technology in the electric discharge device arts is largely directed to the fabrication of ceramic and metal devices. Ceramics and metals are utilized because devices constructed utilizing ceramic and metal members as integral parts thereof possess a number of advantages. Thus, for example, when electrodes are supported by ceramic spacers a great degree of control may be exercised over interelectrode spacings. This makes extremely closely spaced electrodes, and the consequent attainment of extremely high frequencies, possible. Other advantages are the high temperature characteristics and the ease of manufacture of such devices.

In forming electric discharge devices from metals and ceramics, a plurality of electrode-supporting metal members are stacked and spaced from one another by ceramic spacers. The stacked assembly is then fired in vacuo and the ceramic and metal are bonded together by hermetic seals and form the device envelope. In such device fabrication techniques, several problems arise which render the processes less useful and more difficult to perform. Thus, if the device so formed is to be gas filled, a gaseous atmosphere must later be admitted to the device. Additionally, the devices, when formed in vacuo, require several hours to cool from the forming temperature to operating temperature and thus tie up expensive machinery for long periods of time.

Another serious problem attendant the making of ceramic and metal electric discharge devices, one which is particularly important in devices such as voltage regulators and ionization gauges, is that of low leakage resistance. When a metal such as titanium is fused with a ceramic in vacuo at high temperatures, an atomic hydrogen-water vapor cycle is established which results in the deposition, upon the surface of the insulators present, of a conducting metallic film. When titanium is heated above 1000° C., atomic hydrogen is released from its surface. This atomic hydrogen strikes the ceramic, reducing some of the oxide thereof to form a conducting film. Water vapor formed by this reaction returns to the titanium and is dissociated, forming more atomic hydrogen, and the cycle is repeated. Conducting films built up by this cycle upon the ceramic surfaces are responsible for low leakage resistance which lowers the efficiency of the discharge devices so formed.

In accord with my present invention I avoid these problems by firing ceramic and metal components of gaseous discharge devices stacked in place to cause bonding therebetween while the entire assembly is enclosed in an atmosphere of one or more noble gases with which the devices are to be charged, at an appropriate pressure. By using a noble gas or gases rather than a vacuum, low leakage resistances are avoided since the mean free path of atomic hydrogen is very short in these gases and, before the atomic hydrogen can migrate to the ceramic surface, it recombines as molecular hydrogen. The surface of the ceramic is not reduced, and no metallic conducting film is formed. Since titanium is an excellent getter for gases such as $H_2$, $O_2$, $CO_2$, $H_2O$, $N_2$ and the like, normally present in noble gases, the residual atmosphere left in the devices after firing is of extremely pure noble gas or gases. Additionally, since the noble gases are good thermal conductors, the discharge devices so formed can be cooled to room temperature in 15 to 20 minutes rather than in the several hours required in an evacuated apparatus. In the practice of the present invention, once the devices are made, no further charging need take place. Finally, since outgassing may be accomplished in a noble gas atmosphere, gaseous discharge devices may be made without the use of expensive equipment to reduce operating pressures to the conventional outgassing temperature of $10^{-5}$ mm. or less.

The apparatus of Fig. 1 with which the invention may be practiced, comprises a bell jar 1 sealed to a working bench top 2 by gasket 3. Bell jar 1 contains a horizontal surface 4, appropriately supported, upon which there is mounted a metallic susceptor or heat concentrator 5. Within susceptor 5 a gaseous electric discharge device 6 is held in compression with a spring biased ceramic tab 7 urged with a suitable helical spring 8 which urges against horizontal plate 9 suitably supported from working table 4. An induction heating coil 10 supplies energy to couple with susceptor 5 to heat the reaction area. A first orifice 11 in working table top 2 is connected through valve 12, operated by bellows 13, to a vacuum system not shown. A second orifice 14 in table top 2 is connected through valve 15 with a source of a stable noble gas such as helium, argon, neon, krypton, xenon or mixtures thereof at a suitable adjustable pressure.

In Fig. 2 of the drawing there is shown an exploded view of gaseous discharge device 6 which is a voltage regulator device and the materials which enter into its construction. In Fig. 2 the device comprises a cathode cylinder 16, a ceramic insulator 17 and an anode end-wall 18 having inserted therein an anode pin 19. In assembling the device in a stack for fabrication into a gaseous discharge device, a first metallic washer 20, composed of an alloying material, is inserted between anode end-wall 18 and ceramic member 17, while a second metallic washer 21, composed of the same alloying material, is inserted between ceramic member 17 and cathode cylinder 16. The finished discharge device 6 is described and claimed in my copending application Serial No. 690,847 filed concurrently herewith and assigned to the present assignee.

Cathode cylinder 16 and anode end-wall 18 in the practice of the present invention, are preferably composed of titanium although the invention is operative if zirconium replaces the titanium in whole or in part. Ceramic insulating member 17 is composed of a suitable ceramic which matches the thermal coefficient of expansion of titanium thus facilitating bonding thereto at high temperatures and subsequent use at low temperatures without cracking, crazing or fracture of the bond. A suitable group of ceramics of this nature are denominated Forsterites. One such Forsterite is disclosed and claimed in the copending application of A. G. Pincus, Serial No. 546,215, filed November 10, 1955, and assigned to the assignee of the present invention now Patent No. 2,912,-340 issued Nov. 10, 1959.

Sealing material washers 20 and 21 comprise thin foil-like annular members of a metallic material which forms, with titanium, a low melting eutectic which wets ceramic member 17 well, causing the formation of a metallized surface thereupon and facilitating the hermetic bonding thereto of titanium bodies 16 and 18. While in the practice of the present invention suitable bonds may be formed utilizing sealing materials of nickel, platinum, chromium, iron, cobalt, copper and alloys therebetween I preferably use nickel as the sealing or bonding material. This is because of the fact that nickel, in addition to possessing the characteristics of forming a low melting point eutectic with titanium and forming good hermetic seals between titanium and ceramic bodies, also possesses the characteristic of having an extremely low vapor pressure at the temperature at which its eutectic with titanium is formed, namely approximately 955° C. Discharge devices formed in accord with the present invention using nickel are, therefore, free of nickel vapor which may possibly condense upon the several parts thereof.

In Fig. 3 of the drawing there is shown an ionization gauge including an anode 22, a cathode 23 and collector electrodes 24 and 25. The metallic titanium members of this device are separated by a titanium-matching ceramic body to which these parts are hermetically sealed in accord with the present invention. This ionization gauge is disclosed with greater particularity and claimed in my copending application Serial No. 690,848 filed concurrently herewith and assigned to the present assignee.

In Fig. 4 of the drawing there is illustrated, in a partially cross-sectioned view, a voltage-regulator device which may also be fabricated in accord with the present invention. The voltage-regulator of Fig. 4 includes a titanium cathode plate 27, a titanium anode plate 26 and intermediate titanium cathode-anode plates 28, each titanium part being separated from adjacent titanium members by ceramic members 29 which form hermetic seals therewith. The device of Fig. 4 is described with greater particularity and claimed in my copending application Serial No. 690,850 filed concurrently herewith and assigned to the present assignee, now Patent No. 2,887,614, issued May 19, 1959.

In Fig. 5 of the drawing there is illustrated a thyratron gaseous discharge device which may also be constructed in accord with the present invention. The device of Fig. 5 includes an anode cylinder 30, a cathode 31, a grid 32 and a pair of end-wall members 33. These members are separated from one another by titanium-matching ceramic annular members 34 which form hermetic seals therewith. The device of Fig. 5 is described with greater particularity and claimed in my copending application Serial No. 690,851 filed concurrently herewith and assigned to the present assignee.

My invention may be practiced in accord with a number of modifications depending upon the device to be fabricated, the gas used and the particular requirements imposed thereby. Thus, for example, if the invention is to be practiced in forming an ionization gauge such as that illustrated in Fig. 3, or an electric discharge device subassembly wherein it is not necessary that the device be filled with gas at the time the device is assembled, the invention is practiced by mounting the constituent parts of the device in compression in the apparatus of Fig. 1, flushing the device for approximately 2 or 3 minutes with a suitable noble gas such as welding-grade argon at a pressure slightly in excess of 1 atmosphere while heating the parts to outgassing temperature, further raising the temperature of the apparatus to sealing temperatures in order to form metal to ceramic seals and then allowing the device to cool.

If, on the other hand, the device being fabricated is a voltage-regulator device such as illustrated in Figs. 2 or 4 or a thyratron as illustrated in Fig. 5, it is necessary to outgas the device before forming the seals. This may be accomplished in two alternative methods. In one method when the charging gas is extremely expensive, the conventional method utilized in the prior art outgas may be utilized, namely the entire apparatus may be evacuated to a pressure of approximately $5 \times 10^{-5}$ mm. of mercury or less while the device components are heated to a temperature of approximately 700–900° and held at that temperature for approximately 15 or 20 minutes. After this, the noble gas or mixture of noble gases utilized to charge the device may be admitted at proper pressure, the apparatus heated to sealing temperature until the hermetic seals are formed between the titanium and ceramic bodies, after which electrical power is disconnected and the devices are allowed to cool. This modification of the invention has the disadvantage that the complicated and expensive vacuum equipment required by prior art methods of fabricating electric discharge devices must also be utilized. Thus, in order to achieve a pressure of $5 \times 10^{-5}$ mm. of mercury, a mercury diffusion or oil diffusion pump must be utilized. A period of approximately one hour usually is required in order to achieve the desired vacuum.

In accord with a preferred method for performing my invention, the apparatus is closed after having placed the component parts of the device to be fabricated in a suitable jig. Valve 15 is opened to allow the desired noble gas or mixture thereof at a desired pressure, for example 100 mm., to enter the reaction chamber. The vacuum pump is allowed to continuously exhaust this gas from the apparatus at substantially the same rate at which the gas is being supplied through entrance orifice 14. This supplying and flushing with noble gas at a moderately low pressure is continued for approximately 15 to 20 minutes while the temperature of the device components are raised to a temperature of approximately 700–900° C. to outgas the parts. After outgassing, the inlet and outlet valves are closed, maintaining a suitable pressure of the desired noble gas or mixtures thereof in bell jar 1, the temperature is raised to a temperature at which ceramic to metal seals form, which temperature may, for example, be approximately 1050° C., and the temperature is discontinued upon observation of seal formation. The device is then allowed to cool to room temperature. This modification of the invention has the advantage that only a mechanical fore pump need be utilized in order to attain the moderately low pressure utilized and that this pressure may be attained in a relatively short period of time of one or two minutes as compared with the time necessary to achieve pressure of $5 \times 10^{-5}$ mm.

In all modifications of the method of forming noble gas charged gaseous electric discharge devices by firing to form metal ceramic seals in an atmosphere with which the device is to be charged, the gas pressure is adjusted so that upon cooling the pressure within the device is at the desired operating pressure. This requires that Charles' law be taken into account. The pressure within the bell jar at the time the seals are formed is a multiple of the desired operating pressure equal to the ratio of the absolute temperature at the time the seals are made to the absolute temperature at which the device is to operate.

Thus, for example, in forming the devices illustrated in Figs. 2 and 4 of the drawing at 1050° C., wherein operating pressures are of the order of 20 mm. of mercury, ceramic to metal seals are formed within bell jar 1 of Fig. 1 while a pressure of an inert gas or suitable mixture thereof is maintained at approximately 4.5 times the operating pressure, or approximately 90 mm. of mercury. Upon cooling to room temperature it is found that the pressure within the devices is approximately equal to 20 mm. of mercury.

In forming gaseous discharge devices in accord with the present invention, outgassing is carried out at conventional temperatures and times, as for example 700 to 900° C. for 15–20 minutes. The temperature at which the ceramic to metal seals are formed depends upon the sealing material utilized. The stacked assembly must be heated to a temperature at least as high as the eutectic temperature of the system formed by titanium and the sealing material. These temperatures vary from 875° C. when copper is used to 1200° C. when platinum is used. The temperature must not be raised too high, or be maintained too long, or the sealing material may penetrate into the ceramic body and adversely affect its insulating characteristics. In practice the high sealing temperatures are maintained only until the sealing material is observed to melt, alloy, and flow over the ceramic body. As a practical matter this generally is achieved by limiting the sealing temperature to no higher than 100° C. above the eutectic temperature, and maintaining this temperature for 1 to 5 minutes.

In one specific example of the practice of the invention, an ionization gauge as illustrated in Fig. 3 (which is drawn to scale and enlarged approximately 2 times) was built. Parts of titanium and a Forsterite ceramic, as disclosed in the aforementioned Pincus application, were stacked to form the device. Thin nickel washers approximately 0.0003" thick were inserted between adjacent ceramic and titanium parts to form a sealing alloy. A compressive pressure of approximately 10 pounds per square inch was applied as illustrated in Fig. 1. The bell jar was closed and argon gas at one atmosphere of pressure was flushed through the bell jar at a rate of approximately 2 cubic feet per minute for approximately 2 minutes. The temperature of the stacked parts was then raised to approximately 1050° C. and held at this temperature for approximately 2 minutes. At this time the nickel washers located between each of the adjacent ceramic and metal parts were observed to melt and wet the surface of the ceramic. At this point electrical power to the induction heating coil was disconnected and the entire apparatus was cooled to room temperature, by normal gas convection, in approximately 20 minutes. Upon removal, the device was found to be hermetically sealed at all points except the opening left by the flanged inlet member.

In another specific example of the practice of the invention, a voltage-regulator device shown in the apparatus of Fig. 1 having dimensions of approximately 2" in length and ½" in diameter was made. The individual members were stacked as shown in Fig. 2, a thin nickel washer of approximately 0.0003" thickness being placed between each adjacent ceramic and titanium part. The parts were then placed in the apparatus of Fig. 1 and subjected to a compressive stress of approximately 10 pounds per square inch. The bell jar was sealed and a mercury vapor pump used to evacuate the bell jar to a temperature of approximately $10^{-5}$ mm. of mercury. With this vacuum held by the vacuum pump, the stacked assembly was raised to a temperature of approximately 900° and held at this pressure for 15 minutes. After 15 minutes' time the vacuum outlet was closed and the argon inlet valve was opened, allowing sufficient argon gas into the bell jar to increase the pressure therein to approximately 100 mm. of mercury. Electrical energy was then supplied to the induction heating coil to raise the temperature of the stacked assembly to approximately 1050° C. This temperature was held for approximately 3 minutes at which time the nickel washers were observed to form a eutectic melt and fuse to the ceramic body. Electrical energy was then disconnected and the device was allowed to cool with the gas pressure at 100 mm. of mercury until a temperature of 800° C. was reached. At this time argon at one atmosphere pressure was allowed to enter into the bell jar to cause complete cooling to room temperature in a time of approximately 20 minutes.

In another specific example of the practice of the invention a voltage-regulator device as illustrated in Fig. 1 and having dimensions of 2" in length and ½" in diameter was made. The constituent members of the device were stacked as illustrated in Fig. 2 with a thin nickel washer having a thickness of approximately 0.0003" placed between each of the adjacent titanium and ceramic members. The stacked array was placed in the fixture of Fig. 1 and subjected to a pressure of approximately 10 pounds per square inch pressure. The bell jar was sealed and a mechanical fore pump connected to a vacuum outlet and the bell jar exhausted approximately one minute until the pressure was lowered to approximately 100 mm. of mercury. The gas inlet valve was then opened and welding-grade argon gas at a pressure of approximately 100 mm. of mercury was admitted to the bell jar which was continually exhausted by the mechanical fore pump, maintaining a continuous flow of low pressure argon through the bell jar. Electrical energy was supplied to the induction heating coil to raise the temperature of the stacked members therein to approximately 900° C. The temperature of the stacked array was maintained at 900° C. for approximately 15 minutes while argon gas at a pressure of 100 mm. was continuously flushed therethrough. Next, both inlet and outlet valves to the bell jar were closed and the temperature of the stacked array was raised to approximately 1050° C. and maintained at this temperature for approximately 3 minutes after which the nickel washers were observed to melt and fuse to the ceramic members. Electrical energy to the induction heating coil was then disconnected and the array allowed to cool with the 100 mm. argon gas pressure maintained until the temperature of the device reached 800° C. At this time the gas inlet valve was opened and argon gas at approximately one atmosphere of pressure was admitted to the bell jar to accelerate cooling. The device cooled to room temperature in approximately 20 minutes.

While the invention has been set forth hereinbefore with respect to particular embodiments and specific examples thereof, many changes and modifications will immediately occur to those skilled in the art. Accordingly, I intend by the appended claims to cover all such modifications and changes as fall within the true spirit and scope of the invention.

What I claim as new and desire to secure by Letters Patent of the United States is:

1. The method of making noble gas-filled gaseous electric discharge devices including an envelope having metal and ceramic parts, said metal parts comprising a metal which has active-gas gettering properties, which comprises: mounting said parts in a stack within an enclosure, subjecting said stacked parts to compressive force; flushing the enclosure with a noble gas with which the device is to be charged at a pressure of the order of 10 to 100 mm. of mercury and raising the temperature of the parts to a value at which the ceramic and metal parts fuse together and form hermetic seals while maintaining the ambient gas pressure at a multiple of the desired operating pressure equal to the ratio of the absolute temperature of the parts during sealing to the operating temperature of the device.

2. The method of making noble gas-filled electric discharge devices including an envelope having metal and ceramic parts, said metal parts comprising a metal which has active-gas gettering properties, which comprises: mounting said parts in a stack within an enclosure; subjecting said stacked parts to compressive force; heating the stacked parts to outgassing temperature while continually flushing the enclosure with a noble gas; further raising the temperature of the parts to a value to cause metal and ceramic parts to fuse together and form hermetic seals, while maintaining the ambient gas pressure at a multiple of the desired operating gas pressure equal to the ratio of the absolute temperature of the parts during sealing to the absolute operating temperature of the device.

3. The method of making noble gas-filled gaseous electric discharge devices including an envelope having metal and ceramic parts, said metal parts comprising a metal having active-gas gettering properties, which method comprises: mounting said parts in a stack within an enclosure; subjecting said stacked parts to compressive force; heating the stacked parts to outgassing temperature while flushing the enclosure with an inert gas at a pressure of the order of 10 to 100 mm. of mercury; and raising the temperature of the parts to a value at which the metal and ceramic parts fuse together and form hermetic seals, while maintaining the absolute gas pressure at a multiple of the desired operating pressure equal to the ratio of the absolute temperature of the parts during sealing to the desired operating temperature of the device.

4. The method of making a noble gas-filled gaseous electric discharge device including an envelope having titanium and ceramic parts which method comprises: mounting said parts in a stack within an enclosure and including between each titanium and ceramic member a thin washer of a sealing material which produces, with titanium, a low melting eutectic alloy which wets ceramic bodies; subjecting the stacked parts to a compressive force; heating the stacked parts to approximately outgassing temperature while continually flushing the enclosure with a noble gas to outgas the stacked parts; further raising the temperature of the parts to a value to cause the sealing materials to alloy with the titanium bodies and form an alloy which fuses with the ceramic and forms an hermetic seal therewith, while maintaining the ambient gas pressure at a multiple of the desired operating gas pressure equal to the ratio of the absolute temperature of the parts during sealing to the absolute operating temperature of the device.

5. The method of making a noble gas-filled gaseous electric discharge device including an envelope having titanium and ceramic parts which method comprises: mounting said parts in a stack within an enclosure and including between each adjacent ceramic and metal part a thin washer of a metal selected from the group consisting of iron, nickel, cobalt, copper, platinum, chromium and alloys therebetween; subjecting said stacked parts to a compressive force; heating the stacked parts to approximately 700–900° C. while continually flushing the enclosure with a suitable noble gas to cause outgassing of the parts; further raising the temperature of the parts to a value to cause the sealing material and the titanium to form an alloy which wets the ceramic and forms an hermetic seal therewith, while maintaining the ambient gas pressure at a multiple of the desired operating gas pressure equal to the ratio of the absolute temperature of the parts during sealing to the absolute operating temperature of the device.

6. The method of making a noble gas-filled gaseous electric discharge device including an envelope having titanium and ceramic parts which method comprises: mounting said parts in a stack within an enclosure with a thin washer of a metal selected from the group consisting of iron, nickel, cobalt, platinum, chromium and copper interposed between adjacent ceramic and titanium parts; subjecting the stacked parts to a compressive force; heating the stacked parts to a temperature of approximately 700–900° C. while continually flushing the enclosure with a noble gas to outgas the parts; further raising the temperature of the parts approximately to a value from the temperature at which a eutectic alloy is formed between the sealing material and titanium to a temperature approximately 100° in excess of that value to cause said eutectic alloy to form and wet the ceramic parts to form hermetic seals therewith, while maintaining the ambient gas pressure at a multiple of the desired operating temperature equal to the ratio of the absolute temperature of the parts during sealing to the absolute operating temperature of the device.

7. The method of making a noble gas filled gaseous electric discharge device including an envelope having metal and ceramic parts, said metal parts comprising a metal which has active gas gettering properties, which method comprises: mounting said parts in a stack within an enclosure; subjecting said stacked parts to a compressive force; evacuating with forepump said enclosure to a pressure only as low as approximately 10 to 100 millimeters of mercury; continuously flushing said enclosure with a noble gas with which the device is to be charged at a pressure substantially equivalent to the pressure to which said chamber has been lowered by said forepump; maintaining the flow of noble gas through said chamber for a time sufficient to remove therefrom all gaseous atmospheric constituents other than flushing noble gas; and raising the temperature of parts to a value at which the ceramic and metal parts fuse together and form hermetic seals while maintaining the ambient gas pressure at a multiple of the desired operating pressure equal to the ratio of the absolute temperature of the parts during sealing to the operating temperature of the device.

8. The method of making a noble gas filled electric discharge device including an envelope having metal and ceramic parts, said metal parts comprising a metal which has active gas gettering properties, which method comprises: mounting said parts in a stack within said enclosure; subjecting said stacked parts to a compressive force; evacuating the enclosure with a forepump to a pressure only of the order of 10 to 100 microns of mercury; heating the stacked parts to out-gassing temperature while continuously flushing the enclosure with a noble gas with which the device is to be filled at a pressure substantially equal to the pressure established by said forepump for a time sufficient to remove from said enclosure all gaseous atmospheric constituents other than said noble gas; further raising the temperature of the parts to a value to cause metal and ceramic parts to fuse together and form hermetic seals while maintaining the ambient gas pressure at a multiple of the desired operating pressure equal to the ratio of the absolute temperature of the parts during sealing to the absolute operating temperature of the device.

9. The method of making a noble gas filled gaseous electric discharge device including an envelope having metal and ceramic parts, said metal parts comprising a metal having active gas gettering characteritics, which method comprises: mounting said parts in a stack within an enclosure; subjecting said stacked parts to a compressive force; evacuating said enclosure with a forepump to a pressure only as low as the order of 10 to 100 microns of mercury; heating the stacked parts to out-gassing temperature while continuously flushing the enclosure with a noble gas at a pressure substantially equal to the pressure to which the enclosure is initially evacuated for a time sufficient to remove therefrom substantially all atmospheric constituents other than said noble gas; and raising the temperature of the parts to a value at which the metal and ceramic parts fuse together and form hermetic seals while maintaining the absolute gas pressure within the enclosure at a multiple of the desired operating pressure equal to the ratio of the absolute temperature of the parts during sealing to the desired operating temperature of the device.

10. The method of making a noble filled gaseous electric discharge device including an envelope having titanium and ceramic parts which method comprises: mounting said parts in a stack within an enclosure and including between each adjacent titanium and ceramic member a thin wafer of a sealing material which produces with titanium a low melting eutectic alloy which wets the ceramic body; subjecting said parts to a compressive force; evacuating said enclosure to a pressure only as low as the order of 10 to 100 microns of mercury; heating the stacked parts to approximately out-gassing temperature while continually flushing the enclosure with a noble gas at substantially the pressure to which said enclosure is initially evacuated for a time sufficient to out-gas said parts and remove from said envelope all gaseous atmospheric constituents other than said noble gas; further raising the temperature of the parts to a value to cause the sealing materials to alloy with the titanium bodies and form an alloy which fuses with the ceramic and forms an hermetic seal therewith, while maintaining the ambient gas pressure at a multiple of the desired operating gas pressure equal to the ratio of the absolute temperature of the parts during sealing to the absolute operating temperature of the device.

11. The method of making a noble gas filled gaseous electric discharge device including an envelope having titanium and ceramic parts which method comprises: mounting said parts in a stack within an enclosure and including between each adjacent ceramic and metal parts a thin washer of a metal selected from the group consisting of iron, nickel, cobalt, copper, platinum, chromium, and alloys therebetween; subjecting said stacked parts to a compressive force; initially evacuating said envelope only to a pressure of the order of 10 to 100 microns of mercury; heating the stacked parts to approximately 700° C.–900° C. while continuously flushing the enclosure with a noble gas for a time sufficient to out-gas said parts and remove from said enclosure all gaseous atmospheric constituents other than said noble gas; further raising the temperature of the parts to a value to cause the sealing material and titanium to form an alloy which wets the ceramic and forms an hermetic seal therewith while maintaining the ambient gas pressure at a multiple of the desired operating gas pressure equal to the ratio of the absolute temperature of the parts during sealing to the absolute operating temperature of the device.

12. The method of making a noble gas filled gaseous electric discharge device including an envelope having titanium and ceramic parts which method comprises: mounting said parts in a stack within an enclosure with a thin washer of a metal selected from the group consisting of iron, nickel, cobalt, platinum, chromium, and copper interposed between adjacent ceramic and titanium parts; subjecting said parts to a compressive force; initially evacuating said enclosure to a pressure only as low as approximately the order of 10 to 100 microns of mercury; heating the stacked parts to a temperature of approximately 700° C.–900° C. while continuously flushing the enclosure with a noble gas at approximately the pressure to which said enclosure is evacuated for a time sufficient to out-gas said parts and remove from said enclosure all gaseous atmosphere constituents other than said inert gas; further raising the temperature of the parts approximately to a value from the temperature at which an eutectic alloy is formed between the sealing material and titanium to a temperature approximately 100° in excess of that value to cause said eutectic alloy to form and wet the ceramic parts to form hermetic seals therewith, while maintaining the ambient gas pressure at a multiple of a desired operating temperature equal to the ratio of the absolute temperature of the parts during the sealing to the absolute operating temperature of the device.

References Cited in the file of this patent

UNITED STATES PATENTS

| 2,259,165 | Karasick | Oct. 14, 1941 |
| 2,680,824 | Beggs | June 8, 1954 |
| 2,731,578 | McCullough | Jan. 17, 1956 |
| 2,787,510 | Breadner et al. | Apr. 2, 1957 |
| 2,882,116 | Williams | Apr. 14, 1959 |

FOREIGN PATENTS

| 519,061 | Canada | Nov. 29, 1955 |